United States Patent [19]

Hori et al.

[11] Patent Number: 4,667,644
[45] Date of Patent: May 26, 1987

[54] INTAKE AIR HEATING APPARATUS

[75] Inventors: Makoto Hori, Ohgaki; Etsuji Nomura, Ichinomiya; Hitoshi Niwa; Hirokatsu Mukai, both of Okazaki; Toshiaki Tanaka, Susono, all of Japan

[73] Assignees: Nippondenso Co., Ltd., Kariya; Toyota Jidosha Kabushiki Kaisha, Toyota, both of Japan

[21] Appl. No.: 779,856

[22] Filed: Sep. 25, 1985

[30] Foreign Application Priority Data

Sep. 27, 1984 [JP] Japan ................... 59-144956

[51] Int. Cl.⁴ .............................. F02M 31/12
[52] U.S. Cl. ................... 123/549; 123/556; 219/206; 219/541
[58] Field of Search ............ 123/549, 546, 545, 556, 123/552; 219/205, 206, 207, 504, 505, 541, 544; 338/22 R, 23; 261/142

[56] References Cited

U.S. PATENT DOCUMENTS

| 4,108,125 | 8/1978 | Marcoux et al. | 123/122 F |
| 4,141,327 | 2/1979 | Marcoux et al. | 123/122 F |
| 4,177,778 | 12/1979 | Naitou | 123/557 |
| 4,303,050 | 12/1981 | Platzer | 123/549 |
| 4,308,845 | 1/1982 | Sarto | 123/549 |
| 4,387,690 | 6/1983 | Chiavaroli | 123/549 |
| 4,419,564 | 12/1983 | Marcoux | 123/549 |
| 4,467,773 | 8/1984 | Chiavaroli | 123/549 |

FOREIGN PATENT DOCUMENTS

| 59130 | 5/1978 | Japan . | |
| 154155 | 11/1981 | Japan | 123/549 |
| 56-148658 | 11/1981 | Japan . | |
| 58-32961 | 2/1983 | Japan | 123/549 |
| 58-25652 | 2/1983 | Japan . | |
| 58-104347 | 7/1983 | Japan . | |
| 155267 | 9/1983 | Japan | 123/556 |

Primary Examiner—Tony M. Argenbright
Attorney, Agent, or Firm—Cushman, Darby & Cushman

[57] ABSTRACT

In an apparatus for heating intake air arranged in an intake air passage, a heater member of ceramic material having apertures for passing air therethrough is supported between upper and lower frame members. Metal plate members, such as silver plate members, are inserted between the end portions of the heater member and the electrode lead members which connect the heater member with terminal bolts of the heating apparatus.

12 Claims, 11 Drawing Figures

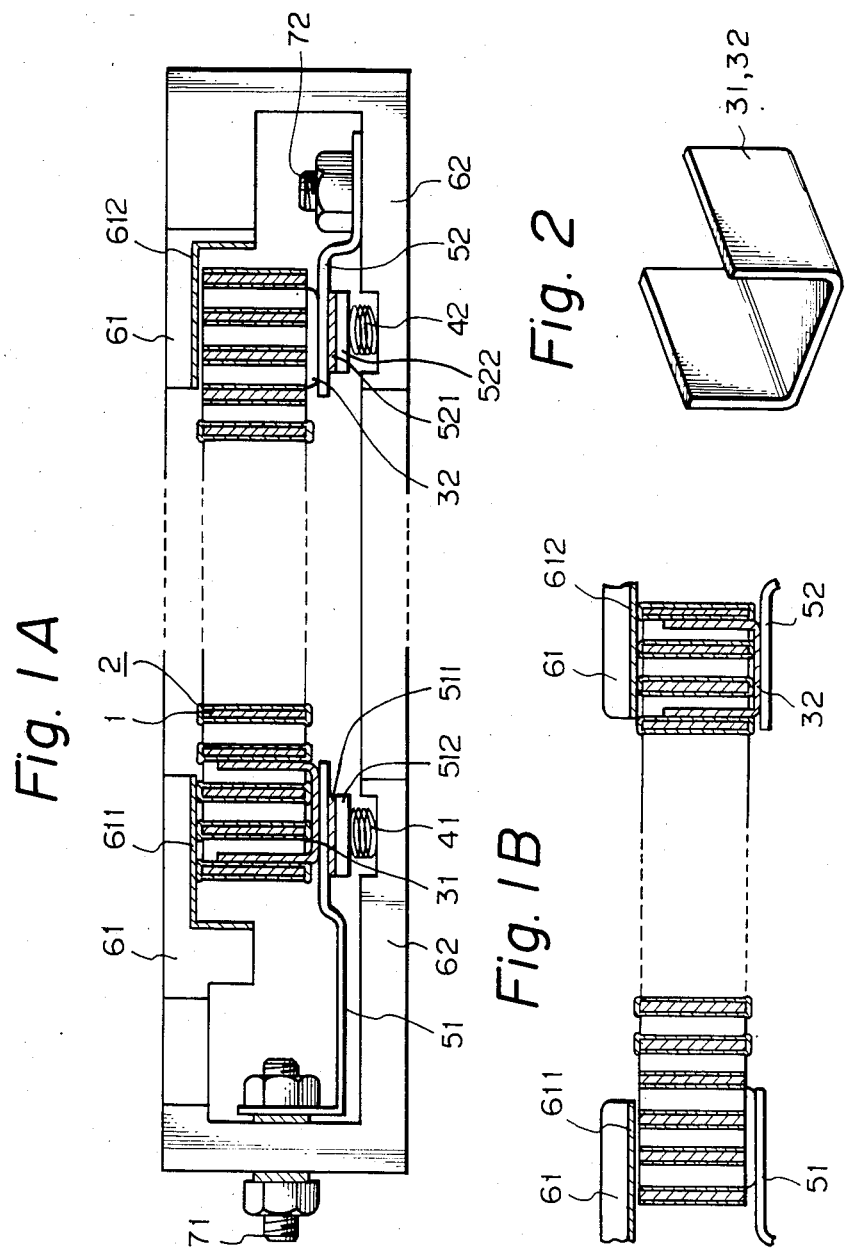

INTAKE AIR HEATING APPARATUS

BACKGROUND OF THE INVENTION

1. Field of the Invention

The present invention relates to an apparatus for heating intake air arranged in an intake air passage used in, for example, a diesel-powered automotive vehicle.

2. Description of the Related Art

As a prior art, an apparatus for heating intake air has been proposed in which a honeycomb structure of semiconductive ceramic material having a positive temperature coefficient is used for a heater member of the heating apparatus. Such a heater member is generally known as a positive temperature coefficient (PTC) heater, and has a self-control temperature characteristic. In this type of heater member a complicated control circuit is not necessary, and there is less possibility of any excessive rise in temperature, and accordingly, such a heater member is considered to be safe. An example of the above prior art apparatus for heating intake air is disclosed in Japanese Unexamined Patent Publication (Kokai) No. 53-59130.

However, when the above heater member is assembled as a constituent of a heating apparatus, a problem may arise in that cracks can occur in the heater member if the heater member is abruptly heated, since the thermal expansion coefficients between the heater member and a metal frame member are different; that is, $8 \times 10^{-6}/°C$. for the heater member and $2.5 \times 10^{-5}/°C$. for the metal frame member. Another problem is that insufficient contact is realized between the heater member and an electrode lead member of an assembly because of the strength of the heater member, and thus abnormal heating may occur and cause the electrodes to melt.

SUMMARY OF THE INVENTION

The object of the present invention is to provide an improved apparatus for heating intake air arranged in an intake air passage in which the difference of thermal expansion coefficient between the portions of the assembly is absorbed so that no ill effect is caused, the electrical contact is sufficiently realized, and accordingly, a satisfactory performance of the apparatus in the assembled state is ensured.

According to the present invention, there is provided an apparatus for heating intake air arranged in an intake air passage including a heater member of ceramic material having apertures for passing air therethrough, and upper and lower frame members for supporting the heater body therebetween. The apparatus also includes electrode lead members for connecting the heater member with terminal bolts of the heating apparatus; and metal plate members inserted between the end portions of the heater member and the electrode lead members.

BRIEF DESCRIPTION OF THE DRAWINGS

In the drawings;

FIG. 1A is a cross-sectional view of the apparatus for heating intake air along the positive electrode array according to an embodiment of the present invention;

FIG. 1B is a cross-sectional view along the negative electrode array adjacent to the positive electrode array shown in FIG. 1A;

FIG. 2 is a perspective view of the metal plate member used in the apparatus shown in FIG. 1A;

DESCRIPTION OF THE PREFERRED EMBODIMENT

Figure 3:
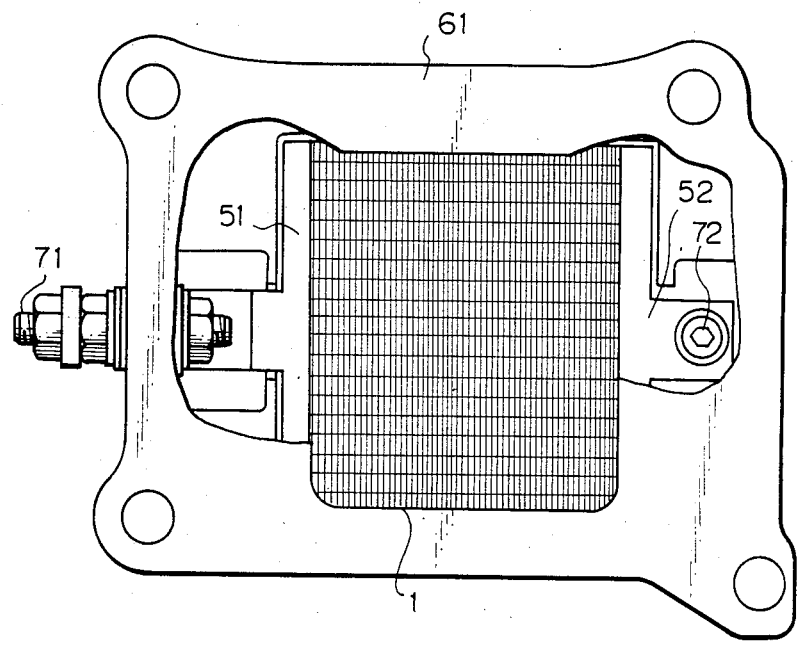
FIG. 3 is a top view of the apparatus for heating intake air shown in FIG. 1A.

The cross-sectional view of the apparatus for heating intake air arranged in an intake air passage is shown in FIG. 1A. The cross-section is taken along the positive electrode array.

The honeycomb structure of the heater member 1 made of a semiconductive ceramic material having a positive temperature coefficient for the heating apparatus includes intermediate electrodes 2 having nickel plating layers and a silver paste coating layer applied to the inner surface of a grid of the heater member.

The positive and negative electrodes for the flow to and flow from the heater member 1 are arranged at the left and right end portions of the heater member 1. The heater member 1 is in contact with the insulation asbestos 611 and 612 arranged on the surface of the frame members 61 and 62.

The U-shaped metal plate members, such as the silver plate members 31 and 32, are inserted at the portion of the heater member where the heater member is connected through said silver plate member to the electrode lead members 51 and 52. The vertical wall portions of the metal plate member 31, 32 are pressed onto the inner surface of the grid of the heater member 1. The suitable material for the electrode lead members 51 and 52 is nickel plated copper or stainless steel such as austenite type SUS steel.

The electrode lead members 51 and 52 are pressed upward via the support metal pieces 512 and 522 having insulation asbestos layers 511 and 521 by the force of the springs 41 and 42. The electrode lead members 51 and 52 are connected with the terminal bolts 71 and 72. The terminal bolt 71 constitutes the positive terminal, and the terminal bolt 72 constitutes the ground terminal.

The size of the silver plate 31, 32 is, for example, 10.0 mm length $\times$ 2.5 mm width $\times$ 0.1 mm thickness. A perspective view of the silver plate 31, 32 is shown in FIG. 2.

The cross-sectional view along the negative electrode array adjacent to the positive electrode array shown in FIG. 1A is shown in FIG. 1B.

The top view of the heating apparatus is shown in FIG. 3. The top view of the structure of the heater member used in the heating apparatus shown in FIG. 1A is shown in FIG. 4.

Figure 4:
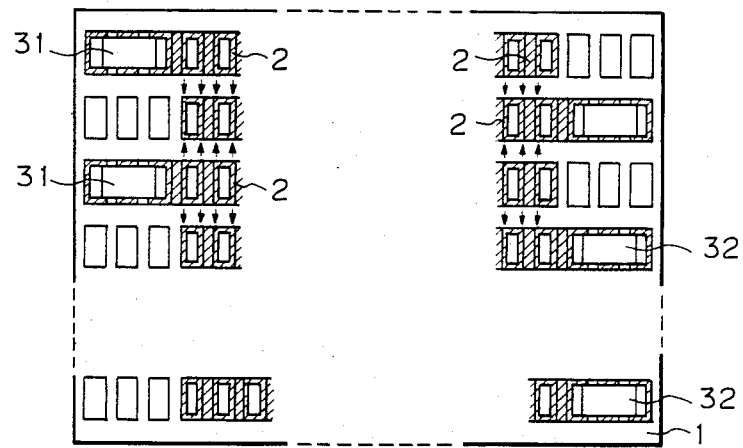
FIG. 4 is a top view of the structure of a heater member used in the apparatus shown in FIG. 1A.

The flow of the current in the heater member 1 shown in FIG. 4 is indicated by arrows in FIG. 4. The current also flows through the nickel plating layer and silver paste coating layer as the intermediate electrode.

By inserting the silver plate into the contact structure between the heater member and the electrode lead member, it is possible to prevent the occurrence of a crack in the heater member upon abrupt heating, insufficient contact between the heater member and the electrode lead member, melting due to abnormal rise of temperature, and the like, since the silver plate has a high electrical conductivity and mechanically soft property.

From the viewpoints of the antioxidant and antivibration properties, silver and gold are more suitable than aluminum, copper, or graphite as material for the metal plate member.

Figure 5A:
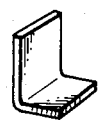
FIGS. 5A, 5B, 5C, and 5D are perspective views of the modified structures of the metal plate member.
Figure 5B:
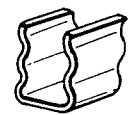
Figure 5C:
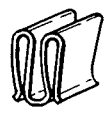
Figure 5D:

Instead of the U-shape of the metal plate member shown in FIG. 1A and FIG. 2, the L-shape (FIG. 5A), the rippling U-shape (FIG. 5B), the M-shape (FIG. 5C), the rippling L-shape (FIG. 5D), or the like can be adopted as the shape of the metal plate member.

For example, the ceramic material such as barium titanate into which lanthanum is solidly soluted or the like can be used as material for the heater member. Also, instead of the honeycomb structure, other air passing structures can be adopted for the structure of the heater member.

Figure 6:
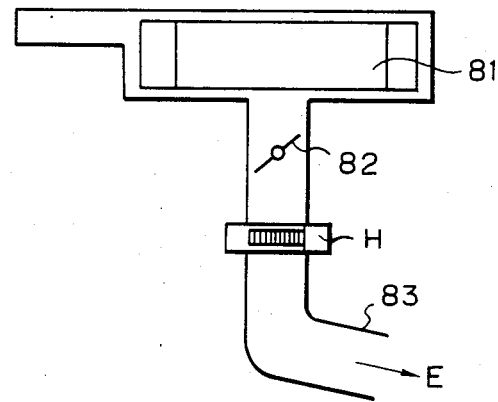
FIG. 6 shows an arrangement of the heating apparatus in the intake air passage.

The arrangement of the heating apparatus H in the passage of the intake air to an engine E is shown in FIG. 6. The apparatus of FIG. 6 includes the air cleaner 81, the throttle valve 82, and the air intake manifold 83.

Figure 7:
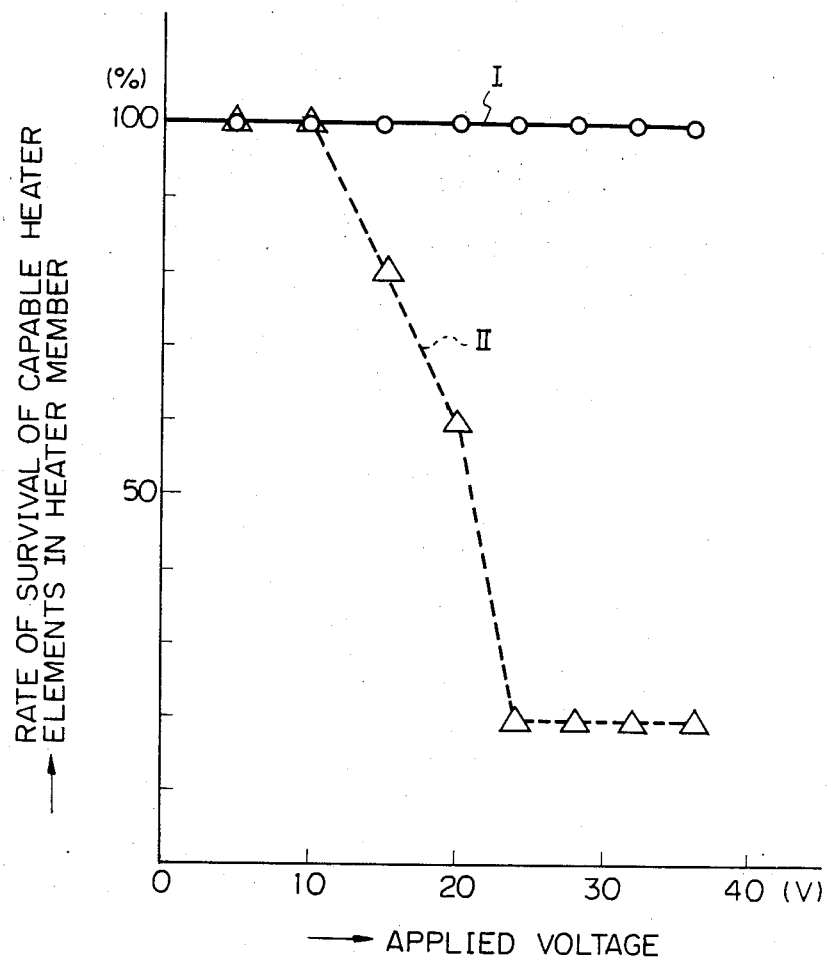
FIG. 7 shows the relationship between the applied voltage and the rate of survival of capable heater elements in a heater member.

The relationship between the applied voltage and the rate of survival of capable heater elements is shown in FIG. 7, as a result of the experiment on the heating apparatus shown in FIG. 1A. In FIG. 7, the abscissa represents the applied voltage in volts, and the ordinate represents the rate of survival of capable heater elements in percentage. The solid line I indicates the case where the silver plate members are provided, and the broken line II indicates the case where the silver plate members are not provided. The number of the tests is 5.

We claim:

1. Intake air heating apparatus adapted to be positioned in the air intake passage of an intake manifold of an internal combustion engine, comprising:
   a heater member of semiconductive ceramic material in the configuration of a grid having apertures for passing air therethrough between opposite sides thereof;
   spaced frame members supporting therebetween edge portions of said heater member;
   a pair of electric terminals fixed to at least one of said frame members;
   electrode lead members connected to said terminals and extending adjacent one side of said heater member; and
   metal plate members inserted between said heater member one side and said electrode lead members and making electrical contact therebetween.

2. An apparatus according to claim 1, wherein said heater member is made of ceramic material having a positive temperature coefficient.

3. An apparatus according to claim 1, wherein said metal plate members are made of silver.

4. An apparatus according to claim 1, wherein said metal plate members are made of gold.

5. An apparatus according to claim 1, wherein said heater member is of a honeycomb structure and has intermediate electrodes constituted by nickel plating layers and silver paste coating layers on the inner surfaces of the grid.

6. An apparatus according to claim 5 including insulating material interposed between one of the frame members and the heater member to prevent electrical contact between the latter and the intermediate electrodes.

7. An apparatus according to claim 1, wherein said apparatus comprises a stack of one of said frame members, said heater member, said metal plate members, said electrode lead members, support metal pieces having insulation layers, springs, and the other of said frame members, and includes intermediate electrodes in said heater member, said metal plate members, and said electrode lead members being electrically tightly connected to each other by the force of said springs.

8. An apparatus according to claim 1, wherein said metal plate member is a U-shape.

9. An apparatus according to claim 1, wherein said metal plate member is an L-shape.

10. An apparatus according to claim 1, wherein said metal plate is a rippling U-shape.

11. An apparatus according to claim 1, wherein said metal plate is an M-shape.

12. An apparatus according to claim 1, wherein said metal plate is a rippling L-shape.

* * * * *